(12) United States Patent
Maeda (10) Patent No.: US 7,443,420 B2
(45) Date of Patent: Oct. 28, 2008

(54) PRINTING SYSTEM INCLUDING A PRINTING APPARATUS FOR PRINTING IMAGE DATA TRANSMITTED FROM AN IMAGE PICKUP APPARATUS IDENTIFIED BY AN APPROVED ID INFORMATION

(75) Inventor: Masamine Maeda, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 744 days.

(21) Appl. No.: 10/745,319

(22) Filed: Dec. 22, 2003

(65) Prior Publication Data
US 2004/0135892 A1 Jul. 15, 2004

(30) Foreign Application Priority Data
Jan. 7, 2003 (JP) ............................... 2003-001372

(51) Int. Cl.
*H04N 5/225* (2006.01)
*H04N 5/232* (2006.01)

(52) U.S. Cl. ................................. 348/207.2; 348/211.2

(58) Field of Classification Search ............. 348/207.2, 348/211.2, 207.99, 231.3, 231.6, 374, 376; 358/1.15; 235/375, 492
See application file for complete search history.

(56) References Cited

U.S. PATENT DOCUMENTS

| | | | |
|---|---|---|---|
| 5,435,544 A * | 7/1995 | Mandel | 270/58.01 |
| 6,151,464 A * | 11/2000 | Nakamura et al. | 399/79 |
| 6,173,119 B1 * | 1/2001 | Manico et al. | 396/6 |
| 6,546,313 B2 * | 4/2003 | Nakahira et al. | 700/223 |
| 6,568,538 B1 * | 5/2003 | Robey | 700/115 |
| 7,391,967 B2 * | 6/2008 | Shizukuishi | 348/211.2 |
| 2002/0071035 A1 | 6/2002 | Sobol | 348/207 |
| 2003/0142215 A1 * | 7/2003 | Ward et al. | 348/207.1 |
| 2003/0206311 A1 * | 11/2003 | Konsella et al. | 358/1.14 |
| 2004/0004735 A1 * | 1/2004 | Oakeson et al. | 358/1.14 |

FOREIGN PATENT DOCUMENTS

| CN | 1356627 A | 7/2002 |
|---|---|---|
| JP | 2000-177212 A | 6/2000 |

* cited by examiner

*Primary Examiner*—Lin Ye
*Assistant Examiner*—Jason Whipkey
(74) *Attorney, Agent, or Firm*—Cowan, Liebowitz & Latman, P.C.

(57) ABSTRACT

A printing system is constructed of an image transmitting apparatus that has a non-contact ID tag permitting non-contact reading and transmits image data by a different communication method from that for the non-contact ID tag, and a printing apparatus that receives the image data transmitted from the image transmitting apparatus, prints an image based on the image data, reads ID information regarding the image transmitting apparatus from the non-contact ID tag, and outputs a printing, which is generated by a printing unit, on the basis of the ID information.

15 Claims, 9 Drawing Sheets

PRINTING SYSTEM INCLUDING A PRINTING APPARATUS FOR PRINTING IMAGE DATA TRANSMITTED FROM AN IMAGE PICKUP APPARATUS IDENTIFIED BY AN APPROVED ID INFORMATION

BACKGROUND OF THE INVENTION

1. Field of the Invention

The present invention relates to a printing system for performing printing by transmitting image data from an image pickup apparatus to a printer.

2. Description of the Related Art

Recent years are witnessing increasing use of digital still cameras and digital video cameras or the like adapted to record/reproduce still images in detachable flash memory cards in addition to tape media. With such growing widespread use, the needs for printing the images captured by such cameras are increasing, and there has been an accelerating trend toward installing self-service printing terminals at convenience stores or similar stores for people who do not have systems constructed of personal computers and printers for printing images out.

According to such printing services, customers bring their memory cards or cameras with them, connect them to the printing terminals and make settings by themselves to perform printing. As this type of technology, there has been known a conventional technology disclosed in, for example, Japanese Patent Application Laid-Open No. 2000-347301.

However, there has been a problem in that a customer using a printing terminal installed at a store cannot leave the printing terminal until the printing is finished, so as to prevent his or her flash memory card or camera connected to a printer from being stolen. There has been another problem in that, if someone else is already using the printing terminal, then he or she has to wait in line, standing in front the printing terminal until the preceding user finishes printing.

SUMMARY OF THE INVENTION

It is an object of the present invention to solve the aforementioned problems.

It is another object of the present invention to make it possible to print out captured images even when a user leaves a printing terminal during a printing operation after having completed a predetermined operation required for performing the printing operation at the printing terminal.

To these ends, according to one aspect of the present invention, a printing system of the present invention including: an image pickup apparatus that has a non-contact ID tag permitting non-contact reading and transmits image data which is picked up by an image pickup unit and recorded on a recording medium, by a different communication method from that for the non-contact ID tag; and a printing apparatus including reading means for reading ID information regarding the image pickup apparatus from the non-contact ID tag, image receiving means for receiving image data transmitted by image transmitting means, printing means for printing an image based on the image data received by the image receiving means, and output means for outputting printings generated by the printing means on the basis of the ID information read by the reading means.

Further objects, features and advantages of the present invention will become apparent from the following description of the preferred embodiments with reference to the attached drawings.

BRIEF DESCRIPTION OF THE DRAWINGS

FIG. 7 is comprised of FIGS. 7A and 7B showing sequence charts illustrating an example of an operation procedure of the printing system according to the second embodiment.

DETAILED DESCRIPTION OF THE PREFERRED EMBODIMENTS

First Embodiment

A first embodiment in which the present invention has been applied to a printing system based on a printing terminal and a digital video camera will be described in conjunction to the attached drawings. It is assumed that a printer in the present embodiment is installed at a convenience store or the like, and a user brings with him a digital video camera incorporating a non-contact ID tag to the store to perform printing.

Figure 1:
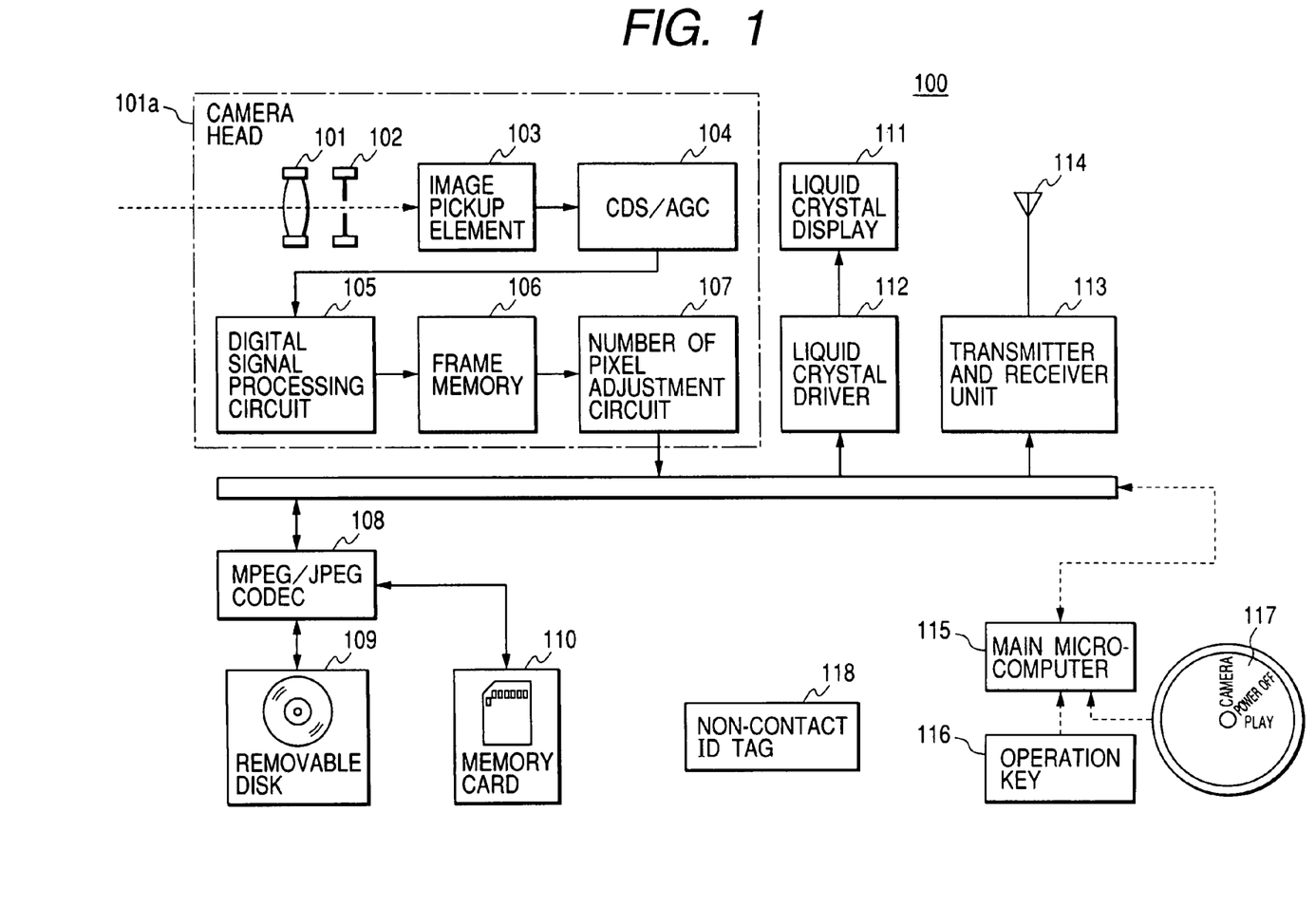
FIG. 1 is a block diagram showing a construction example of a digital video camera according to an embodiment of the present invention.

FIG. 1 is a block diagram showing a schematic construction of a digital video camera 100 (hereinafter referred to simply as "the video camera 100) according to the present embodiment.

The video camera 100 shown in FIG. 1 has a photographic lens 101 for capturing an object, an iris 102 for controlling the quantity of light to an image pickup device, which will be discussed hereinafter, an image pickup device 103 for converting a captured object into an image signal, a CDS/AGC 104 for sample-holding the image signal to obtain an appropriate signal level, a digital signal processing circuit 105 for carrying out A/D conversion on the image signal received from the CDS/AGC 104 to perform digital signal processing, a frame memory 106 for storing raw data from the digital signal processing circuit 105 by each frame, and a number of pixel adjustment circuit 107 for adjustment the number of pixels so as to allow pixels in the frame memory 106 to be recorded in a DV method, which will be discussed hereinafter. The block constituted of the photographic lens 101 through the pixel number adjustment circuit 107 is referred to as a camera head 101a.

The video camera 100 further includes an MPEG/JPEG codec 108 for compressing and coding/decoding image data according to MPEG system for moving images or JPEG system for still images, a removable disk 109 for recording the coded MPEG or JPEG compressed image data, a memory card 110 for recording the coded MPEG or JPEG compressed image data, and a liquid crystal display 111 for displaying reproduced image data received from the MPEG/JPEG codec 108 in a reproduction mode or for displaying through-images from the camera head 101a or other necessary information in a photographing mode.

The video camera 100 further includes a liquid crystal driver 112 for driving the liquid crystal display 111, a transmitter and receiver unit 113 for transmitting compressed image data generated by the MPEG/JPEG codec 108 to the printing terminal and for receiving control signals (to be discussed later) from the printing terminal, and a transmitting and receiving antenna 114 connected to the transmitter and receiver unit 113.

A main microcomputer 115 reads statuses of an operation key 116 and controls implementation of various functions, and reads a mode dial 117 and controls a mode of the entire digital video camera. A non-contact ID tag 118 storing information for identifying the video camera 100 is read in a non-contact manner by the printing terminal.

Figure 2:
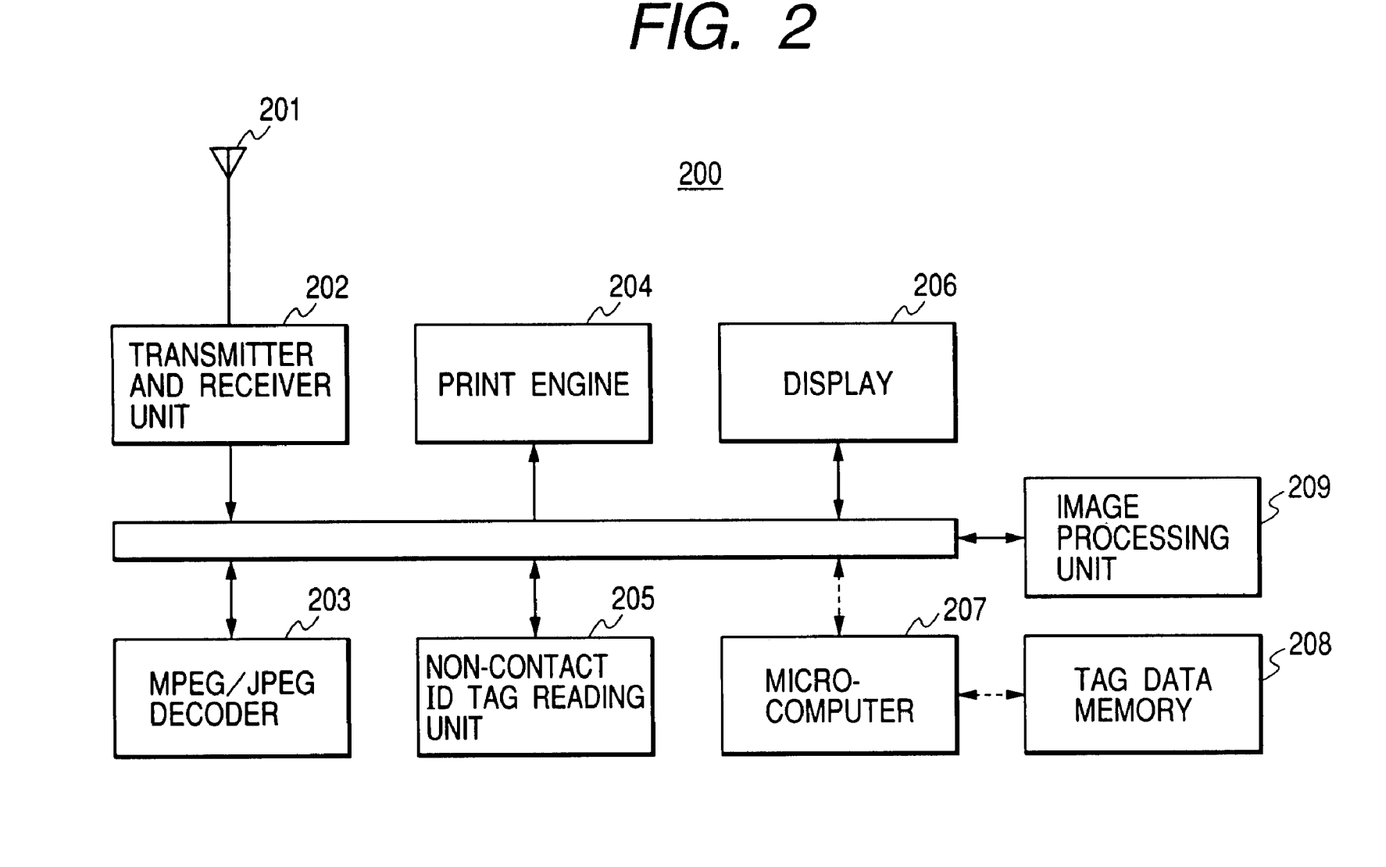
FIG. 2 is a block diagram showing a schematic construction of a printing service machine according to a first embodiment.

FIG. 2 is a block diagram showing a schematic construction of a printing service machine 200. Referring to FIG. 2, a transmitting and receiving antenna 201 is connected to a transmitter and receiver unit 202, which will be discussed later. The transmitter and receiver unit 202 receives compressed image data transmitted from the video camera 100 and transmits control signals, which will be discussed later, to the video camera 100. An MPEG/JPEG decoder 203 decodes the compressed image data received by the transmitter and receiver unit 202.

A print engine 204 prints a frame image of the decoded JPEG image or MPEG image on a predetermined sheet. A non-contact ID tag reading unit 205 reads, in the non-contact manner, identification information of the non-contact ID tag 118 of the video camera 100. A display 206 displays image data or various types of information from the MPEG/JPEG codec 203. A microcomputer 207 manages data in a tag data memory, which will be discussed later, and controls the entire machine. A tag data memory 208 for storing data read out from the non-contact ID tag reading unit 205. An image processing unit 209 corrects image data to be printed out, according to image correcting conditions to be described hereinafter.

Figure 3A:
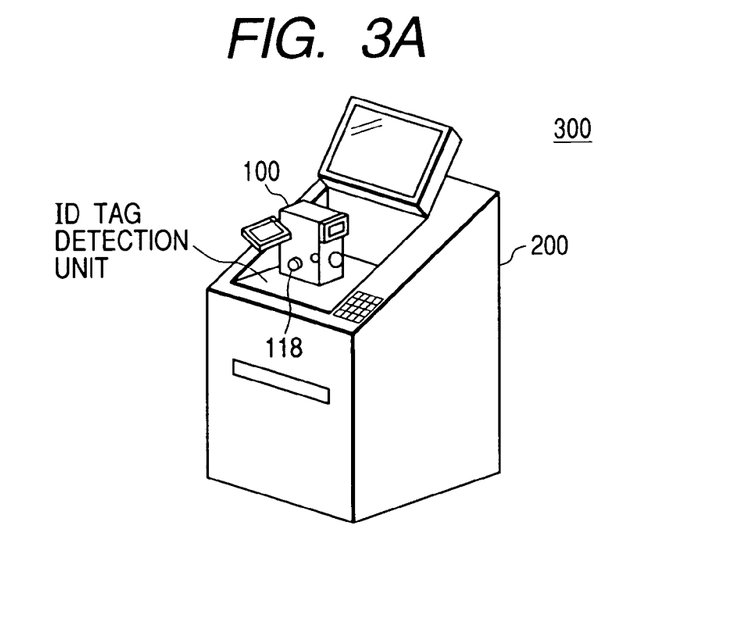
FIGS. 3A and 3B are schematic diagrams showing a printing system according to a first embodiment.
Figure 3B:
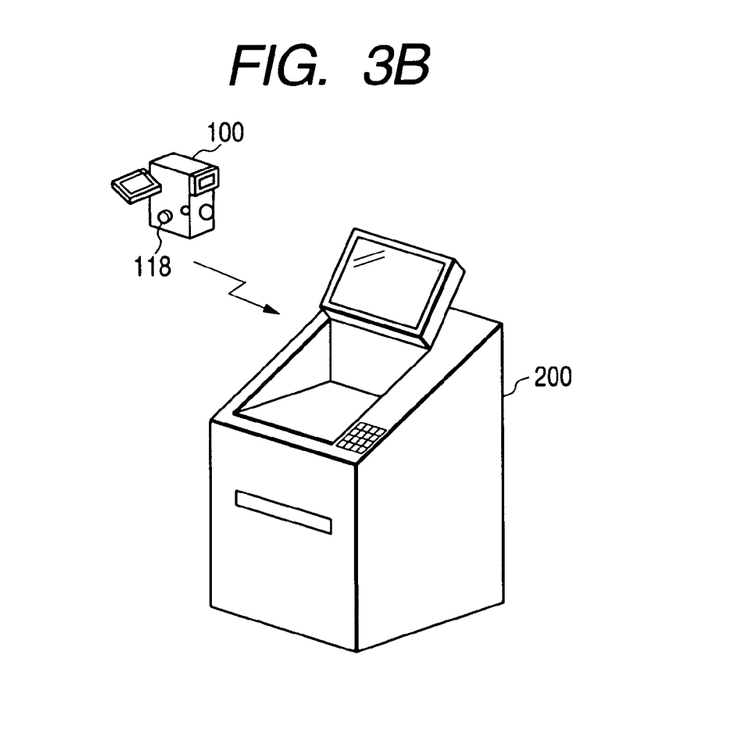

FIGS. 3A and 3B show schematic diagrams of a printing system 300 according to the present embodiment. An example of an operation procedure in the present embodiment having the construction described above will be explained by referring to the sequence chart shown in FIG. 4.

Figure 4:
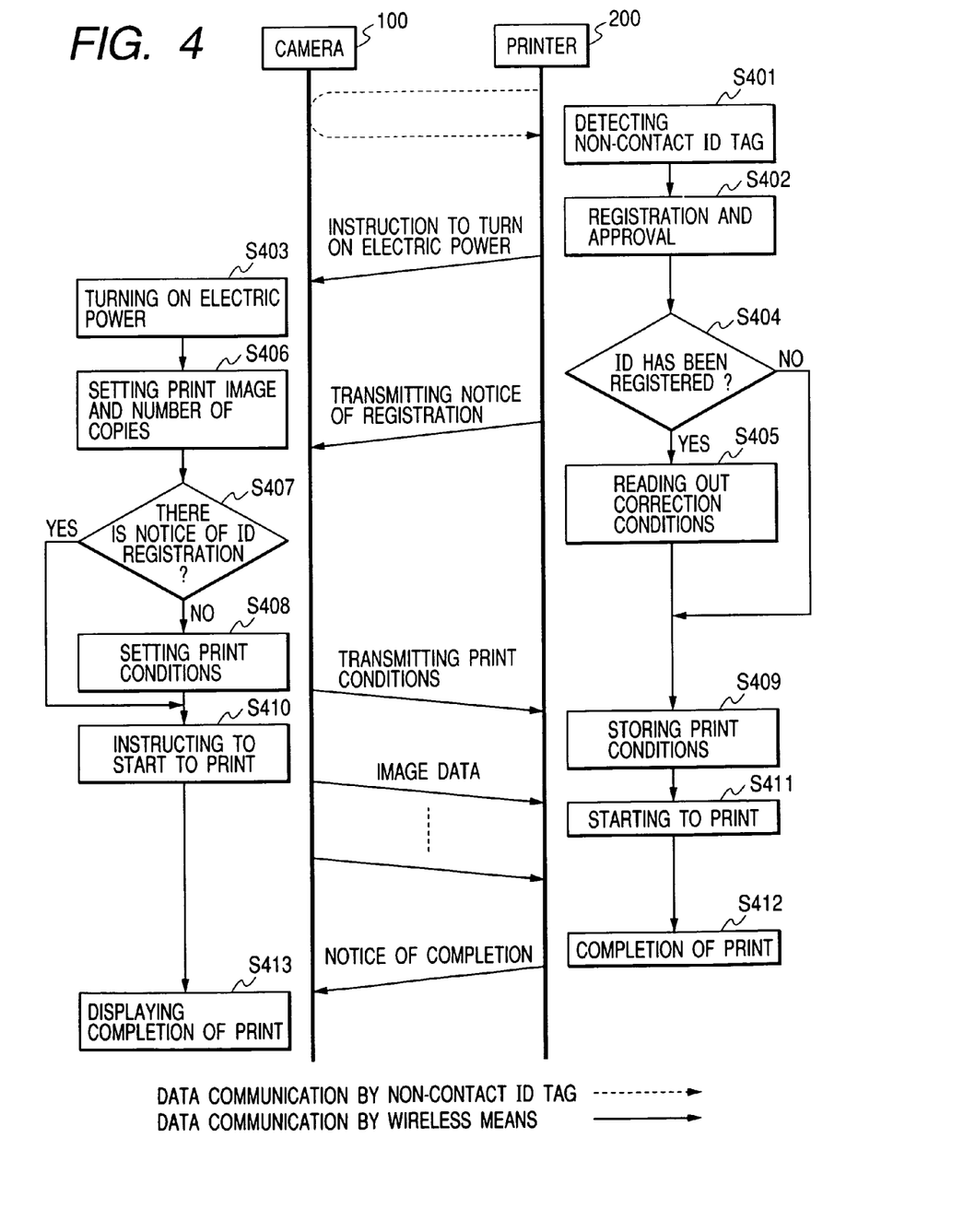
FIG. 4 is a sequence chart showing an example of an operation procedure of the printing system according to the first embodiment.

As shown in FIG. 3A, when a user places the video camera 100 that he or she has brought at a predetermined position of the printing service machine 200, the non-contact ID tag 118 is detected by the printing service machine 200 and the identification information of the video camera 100 is read in the non-contact manner, as shown by S401 in FIG. 4.

When reading is successfully performed, the read identification information is registered and stored in the tag data memory 208. Thereafter, the printing service machine 200 transmits a main unit power ON command to the video camera 100 through the transmitter and receiver unit 202 and the antenna 201 (S402).

After the identification information is acquired from the non-contact ID tag, the microcomputer 207 determines whether the identification information has already been registered in the tag data memory 208. If it is determined that the identification information has been registered, then the information indicating that it has been registered is sent to the video camera 100. More data, including print data correction conditions, stored in the tag data memory 208 together with the identification information is read out. If it is determined that the identification information has not been registered in the tag data memory 208, then the microcomputer 207 waits for data, such as correction conditions, to be sent from the video camera 100 (S404).

Upon receipt of the power ON command through the antenna 114 and the transmitter and receiver unit 113, the video camera 100 turns its electric power on and sets a print image selection mode. The main microcomputer 115 displays a screen for selecting print images on the liquid crystal display 111 through the liquid crystal driver 112.

A user operates the operation key 115 of the video camera 100 to set printing conditions, such as an image to be printed out, a print size, or the number of copies (S406). It is then determined if a notice of the identification information having been registered has been received from the printing service machine 200 (S407). If the determination result is negative, then the liquid crystal display 111 further displays correction conditions, including the brightness, contrast or the like of the image, and the user sets the desired correction conditions (S408). When the correction conditions are set, the video camera 100 transmits the set printing conditions and correction conditions to the printing service machine 200. The printing service machine 200 stores the data regarding the received printing conditions and correction conditions in the tag data memory 208 (S409). At this time, if the user registers his or her personal information, such as a name or address, then the printing service machine 200 creates a database of the identification information and personal information, so that the settings, including the image corrections, will be automatically made from the next time.

After completion of all settings, when the user operates the operation key 115 to instruct start of printing, the video camera 100 reproduces specified image data from a disk 109 or a memory card 110 and sequentially sends it to the printing service machine 200 (S410).

Upon receipt of the image data, the printing service machine 200 corrects the image data according to the correction conditions previously received, and begins printing according to the printing conditions.

In the present embodiment, after the instruction of starting the printing is issued, a radio transmission output is increased to make it possible to transmit and receive data even when the distance between the video camera 100 and the printing service machine 200 shown in FIG. 3A is increased, as shown in FIG. 3B.

Thereafter, when the printing service machine 200 completes printing (S412), a command indicating the completion of printing is sent from the printing service machine 200 to the video camera 100. In the video camera 100, the main microcomputer 115 controls the liquid crystal driver 115 to display a message indicating the completion of the printing on the liquid crystal display 111. The user checks the display screen and goes to the printing service machine 200 to get the printings.

Thus, according to the present embodiment, in case of printing images recorded in a disk or memory card by the video camera 100, the identification information of the video camera can be checked using the non-contact ID tag. Storing the identification information in association with correction conditions for printing or a user name, etc. allows printing to be accomplished without the need for setting detailed correction conditions from the next printing and after.

In the present embodiment, correction information is stored and used in association with the identification information of each video camera 100. Alternatively, however, identification codes of model names of the video cameras 100 may be stored instead of the identification information of the individual video cameras 100, and the printing service machine 200 creates and uses a database of image correction information for each model.

Alternatively, the printers 200 of a plurality of stores may be connected through a network, and the above database may be stored in a server of the network.

In the system according to the present embodiment, images recorded by the video camera 100 are printed out. The similar method applies, however, also to a case where images recorded by other image pickup apparatuses, such as digital still cameras, are printed out.

Second Embodiment

A second embodiment according to the present invention will now be described in conjunction with the attached drawings.

The construction of a digital video camera 100 (hereinafter referred to simply as the video camera 100) in the present embodiment is the same as that shown in FIG. 1.

Figure 5:
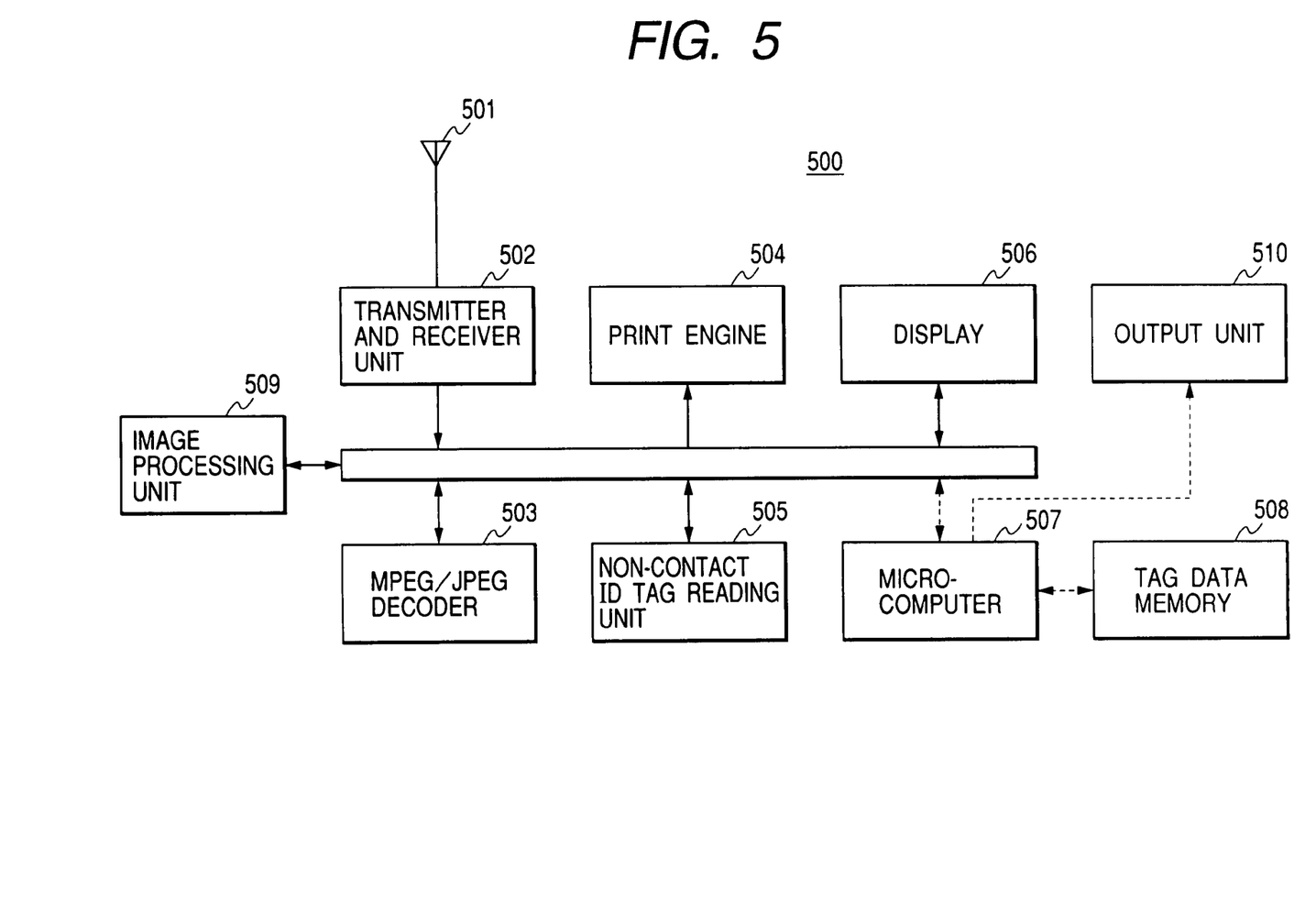
FIG. 5 is a block diagram showing a schematic construction of a printing service machine according to a second embodiment.

FIG. 5 is a block diagram showing the construction of a printing service machine 500 according to the present embodiment.

Figures 7, 7A:
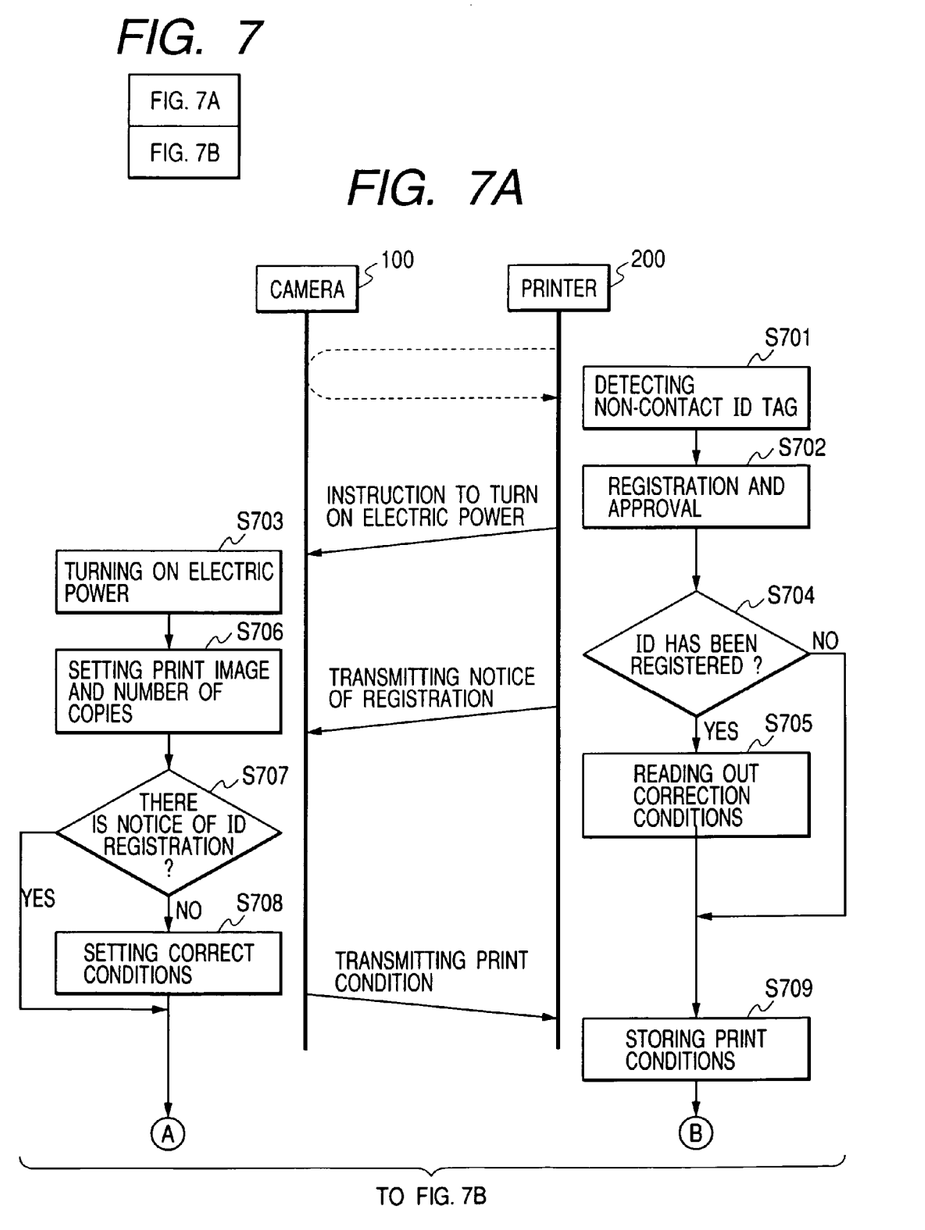
Figure 7B:
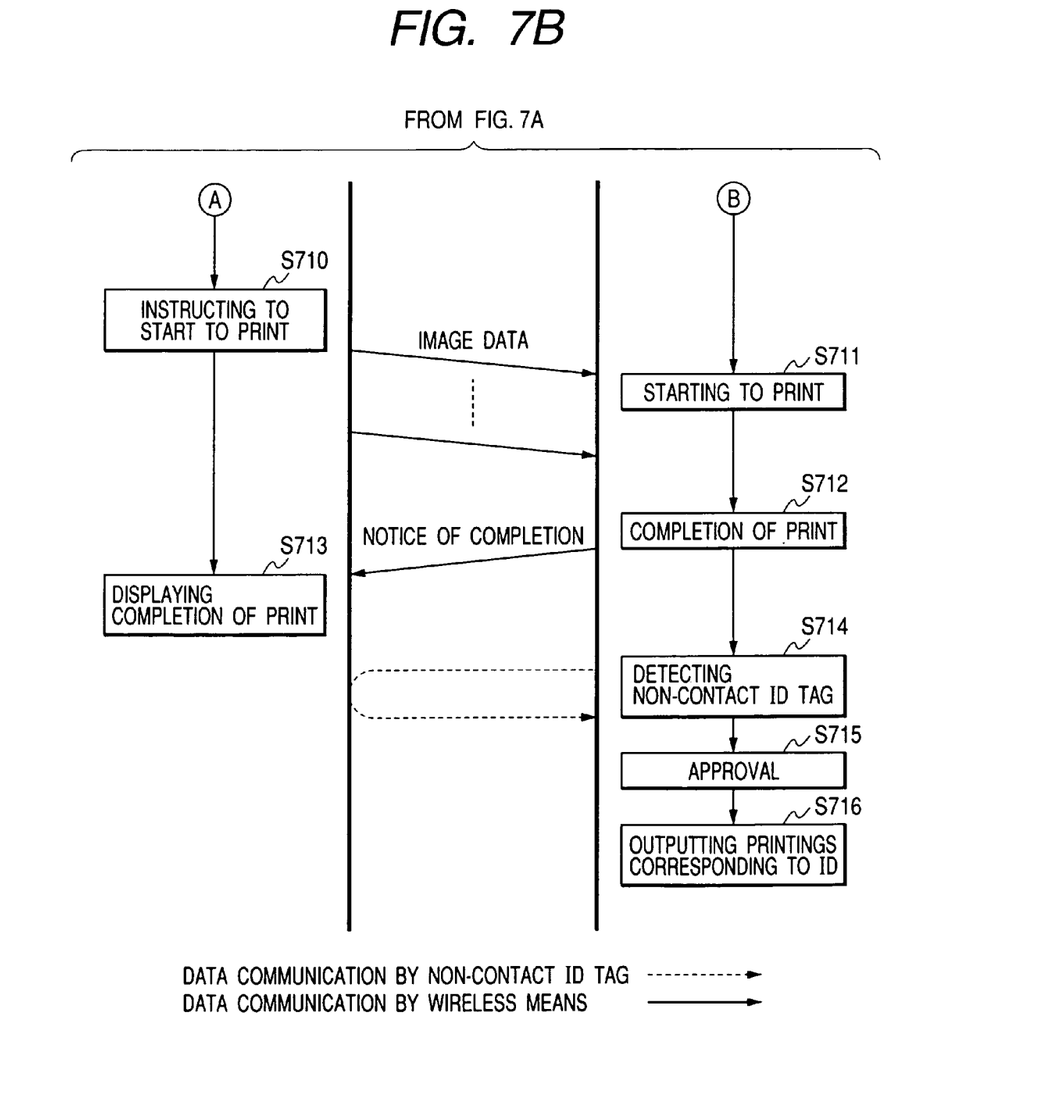

Referring to FIG. 5, the components located from an antenna 501 through a tag data memory 508 are identical to the components located from the antenna 201 through the tag data memory 208 shown in FIG. 2. An output unit 510 holds printings generated by a printing engine 504 in association with identification information regarding the video camera 100, and outputs the printings on the basis of a result of authentication of identification information by a microcomputer 507 after completion of printing, as it will be discussed hereinafter. An operation of the present embodiment having the aforementioned construction will be explained in conjunction with the sequence charts shown in FIGS. 7A and 7B.

Figure 6:
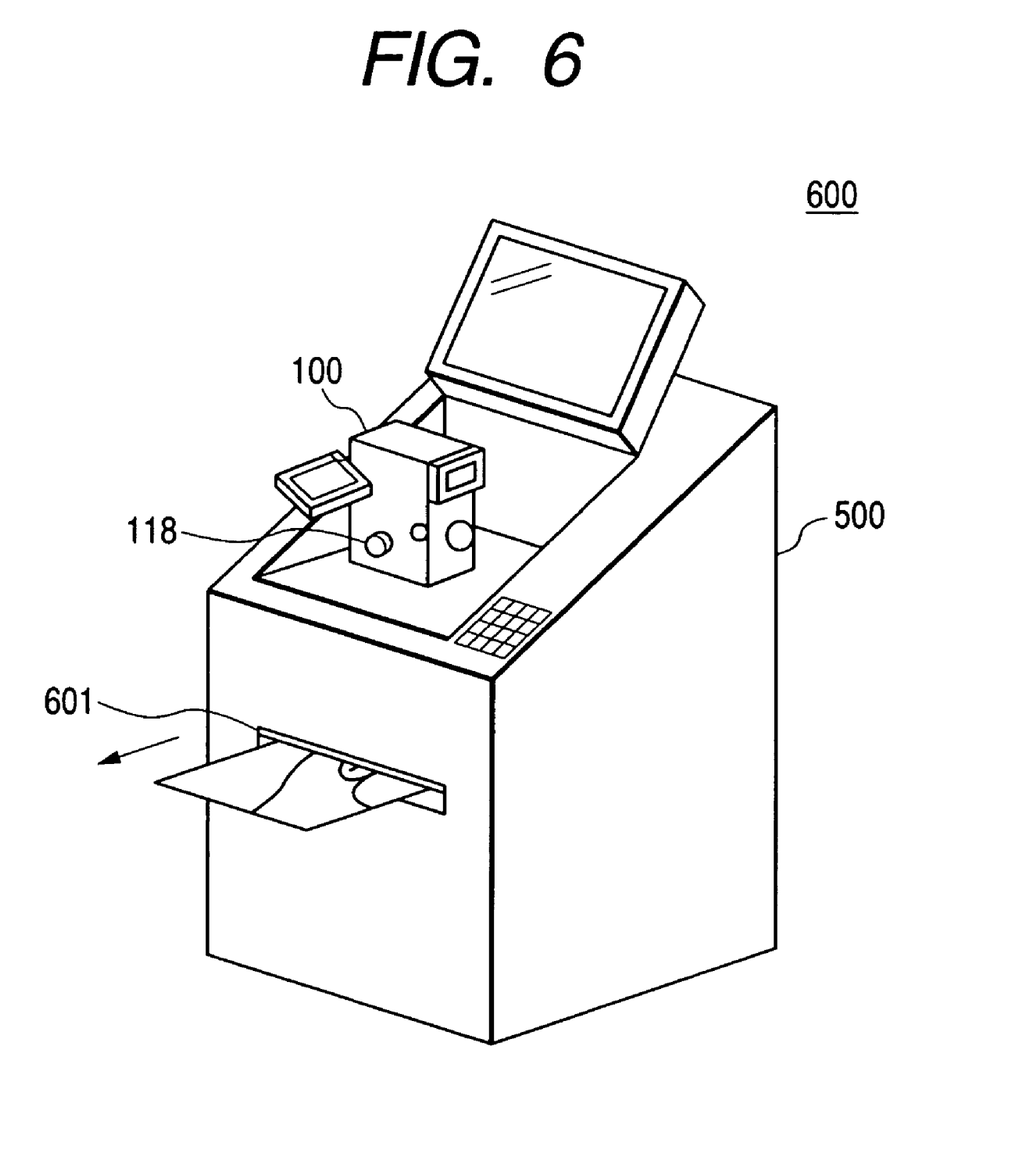
FIG. 6 is a diagram schematically showing a printing system according to the second embodiment.

FIG. 6 shows a printing system 600 in accordance with the present embodiment. When a user places his or her video camera 100 at a predetermined position of the printing service machine 500, as shown in FIG. 6, the printing service machine 500 detects a non-contact ID tag 118 to read identification information of the video camera 100. Thereafter, the same processing from S401 to S413 shown in FIG. 4 is carried out until the information indicating the completion of printing is displayed on the liquid crystal display 111 of the video camera 100 in S713.

When the user checks the displayed message indicating the completion of printing and places the video camera 100 on the printing service machine 500 again, as shown in FIG. 6, the printing service machine 500 detects the details of the non-contact ID 118 of the video camera 100 again (S714) and approves printed copies associated with an ID that matches the read identification information (S715), and then opens an outlet shutter to output the printed copies (S716).

The system according to the present embodiment allows approval of a video camera 100 of a second user and after to be accomplished while the printing service machine 500 is still printing. Upon completion of printing for the first user, the printing for the second user is started. In other words, the reservation for printing is possible.

Figure 8:
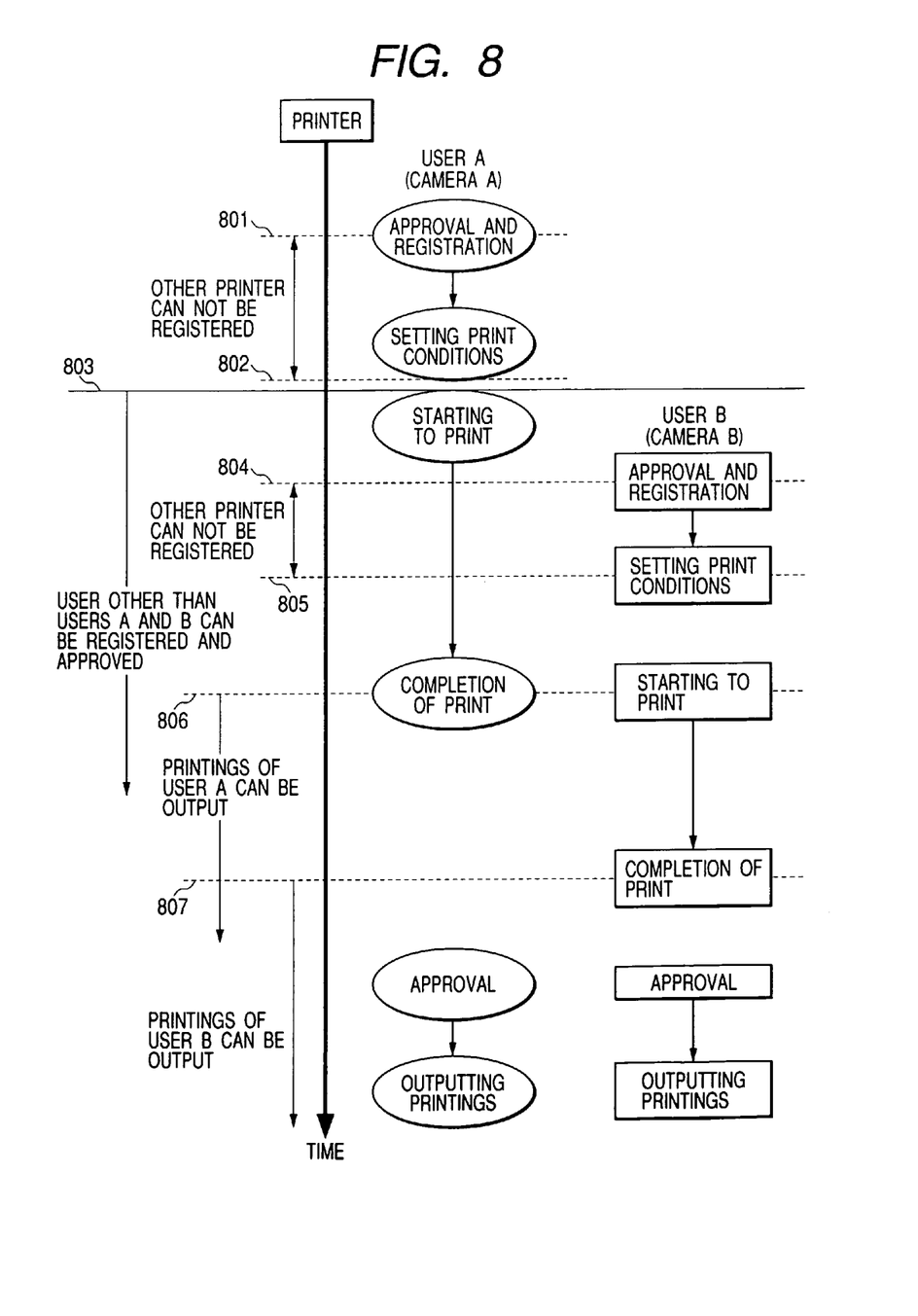
FIG. 8 is a diagram showing operations performed when a plurality of users share the printing system according to the second embodiment.

FIG. 8 is a diagram showing a time course of an operation performed when the printing service machine 500 is shared among two users, i.e., two video cameras.

The video camera of a user A is approved and printing conditions are set in steps 801 and 802, respectively, and printing is begun in step 803. Thereafter, approval and printing instructions for another user, namely, a user B, can be accepted. Referring to FIG. 8, in steps 804 and 805, the approval and setting of printing conditions of a video camera B of the user B are carried out while printing an image from the video camera A of the user A. The set identification information regarding the video camera B is stored in the tag data memory 508 as the information regarding the camera standing by for printing.

Upon completion of printing of the image from the video camera A in step 806, the printing of the video camera B is immediately started. More specifically, according to the sequence charts shown in FIGS. 7A and 7B, after printing of the image data from one video camera is completed in step S712, contents in the tag data memory 508 are checked to determine whether there is a video camera wait for printing. If video camera waiting for printing is found, then a command requesting transmission of image data is sent to the video camera, namely, the video camera B in this case. In response to the transmission request command, the video camera B sends image data to be printed to the printing service machine 500. The processing thereafter is the same. Printings for the video camera A can be taken out even while printing for the video camera B is being performed.

This means that the user A can receive printings after step 806, and the user B can remove printings after step 807.

According to FIG. 8, the user A comes to get printings after step 807. At this time, the information in the non-contact ID tag is detected to output only the printings based on the identification information on the video camera A. This prevents the printings for the user B from being erroneously output.

Thus, as shown in FIG. 8, the present embodiment allows the second and after users to obtain approval and set printing conditions without waiting until the printing for a previous user is finished, thereby attaining efficient operation of the printing service machine 500 to be achieved.

Moreover, approval based on a non-contact ID tag is performed before outputting finished printings, and only the printings that match detected identification information are output. This makes it possible to prevent a user from erroneously getting printings of a previous user who has not yet come back to get his or her printings.

As described above, the image communication system according to the present embodiment makes it possible to achieve a printing system that saves users waiting time even when a preceding user is still printing.

Furthermore, a printing system can be achieved that prevents completed printings from being mixed up in such a case where a plurality of people shares the same printing terminal.

Thus, in using a printing service, a user can move away from a printing service machine while it is printing, once printing is started after settings are made, because data can be sent to the printing service machine via radio waves that cover a relatively large service area. This enables the user to do, for example, shopping or the like in the store where the printing terminal is installed.

Other features of the present invention make it possible to provide an image communication apparatus effectively used with a printing system that allows an image correction database to be properly used without the need of any complicated operations, since models of the cameras or users are managed using non-contact ID tags. Moreover, when the same printing terminal is used among a plurality of people, mixing up of completed prints can be prevented, and a user can obviate waiting in line even if a preceding user is printing.

OTHER EMBODIMENTS

The present invention is applicable to a system constructed of a plurality of apparatuses or to a system constructed of a single apparatus.

The present invention further includes a case where a software program code for implementing functions of an embodiment is supplied from a storage medium or through a transmission medium, such as the Internet, to an apparatus connected to diverse devices or a computer in a system, and diverse devices are operated according to a program stored in the computer (CPU or MPU) of the system or the apparatus.

In such a case, the above software program code itself implements the features of the embodiment described above, and the program code itself and means for supplying the program code to a computer, such as a storage medium storing the program code, constitute the present invention. Such a storage medium for storing the program code includes, for example, a flexible disk, a hard disk, an optical disk, a magneto-optical disk, a CD-ROM, a magnetic tape, a nonvolatile memory card, or a ROM.

Embodiments in accordance with the present invention also include a program code supplied to a computer to implement the features explained in the aforementioned embodiments, or a program code used in combination with an operating system (OS) or other application software or the like run on a computer to implement the features described in the aforementioned embodiments.

The present invention further includes a case where a supplied program code is stored in a memory provided in a function expansion board of a computer or a function expansion unit connected to a computer, and then a CPU or the like provided in the function expansion board or the function expansion unit carries out a part or all of actual processing according to instructions of the program code so as to implement the features of the embodiments described above.

Many widely different embodiments of the present invention may be constructed without departing from the spirit and scope of the present invention. It should be understood that the present invention is not limited to the specific embodiments described in the specification, except as defined in the appended claims.

What is claimed is:

1. A printing system comprising:

an image pickup apparatus that has a non-contact ID tag permitting non-contact reading and transmits image data which is picked up by an image pickup unit and recorded on a recording medium, by a different communication method from that for the non-contact ID tag; and a printing apparatus including a reading unit for reading ID information identifying the image pickup apparatus from the non-contact ID tag of the image pickup apparatus, an image receiving unit for receiving image data transmitted by the image pickup apparatus, a printing unit for printing an image based on the image data received by the image receiving unit, an output unit for outputting printings generated by the printing unit, a retaining unit for retaining the ID information identifying the image pickup apparatus that transmits the image data so that the ID information is associated with printings generated by the printing unit, and a control unit for performing an approval on the basis of ID information newly read by said reading unit from the non-contact ID tag of the image pickup apparatus and the ID information retained by said retaining unit in response to the ID information being newly read by said reading unit from the non-contact ID tag of the image pickup apparatus after said printing unit generates the printings and for controlling the output unit on the basis of the ID information retained by the retaining unit so as to output the printings printed based on the image data transmitted from the image pickup apparatus identified by the approved ID information.

2. A printing system comprising:

an image transmitting apparatus having a non-contact ID tag permitting non-contact reading and image transmitting means for transmitting image data by a different communication method from that for the non-contact ID tag; and a printing apparatus including reading means for reading ID information identifying the image transmitting apparatus from the non-contact ID tag of the image transmitting apparatus, image receiving means for receiving image data transmitted by said image transmitting apparatus, printing means for printing an image based on the image data received by said image receiving means, output means for outputting printings generated by said printing means, retaining means for retaining the ID information identifying the image transmitting apparatus that transmits the image data so that the ID information is associated with printings generated by the printing means, and control means for performing an approval on the basis of ID information newly read by said reading means from the non-contact ID tag of the image transmitting apparatus and the ID information retained by said retaining means in response to the ID information being newly read by said reading means from the non-contact ID tag of the image transmitting apparatus after said printing means generates the printings and for controlling said output means on the basis of the ID information retained by said retaining means so as to output the printings printed based on the image data transmitted from said image transmitting apparatus identified by the approved ID information.

3. A printing system according to claim 2, wherein the printing apparatus prints images related to image data transmitted from a plurality of said image transmitting apparatuses, and said output means retains printings related to image data transmitted from the plurality of said image transmitting apparatuses so that the printings are associated with ID information of each of the plurality of said image transmitting apparatuses.

4. A printing system according to claim 3, wherein said output means selects a printing corresponding to the approved ID information from among printings related to image data transmitted from the plurality of said image transmitting apparatuses, and then outputs the selected printing.

5. A printing system according to claim 3, wherein the printing apparatus comprises a memory for storing ID information regarding the plurality of the image transmitting apparatuses read by the reading means before starting to print images related to image data transmitted from the plurality of image transmitting apparatuses.

6. A printing system according to claim 5, wherein the printing apparatus is capable of reading ID information regarding another image transmitting apparatus by the reading means and storing, in the memory, the read ID information as information that indicates waiting for printing, while the printing apparatus is printing an image based on image data transmitted from one of the plurality of image transmitting apparatuses.

7. A printing system according to claim 6, wherein, after completion of printing of an image based on image data from the one image transmitting apparatus, the printing apparatus immediately starts printing of an image based on image data transmitted from the another image transmitting apparatus.

8. A printing system according to claim 7, wherein, after completion of printing of an image based on image data from the one image transmitting apparatus, the printing apparatus transmits a command requesting the transmission of image data from the another image transmitting apparatus on the basis of the information on waiting for printing that is stored in the memory, and starts printing of an image based on image data transmitted in response to the transmission request command.

9. An image processing apparatus for receiving and processing image data from an image transmitting apparatus having a non-contact ID tag permitting non-contact reading and transmitting means for transmitting image data by a different communication method from that for the non-contact ID tag, said image processing apparatus comprising:

reading means for reading ID information identifying said image transmitting apparatus from the non-contact ID tag of said image transmitting apparatus;

communicating means for receiving image data transmitted by said image transmitting apparatus;

printing means for printing an image based on the image data received by said communicating means;

retaining means for retaining the ID information identifying the image transmitting apparatus that transmits the image data so that the ID information is associated with printings generated by the printing means;

output means for outputting printings generated by said printing means; and control means for performing an approval on the basis of ID information newly read by said reading means from the non-contact ID tag of the image transmitting apparatus and the ID information retained by said retaining means in response to the ID information being newly read by said reading means from the non-contact ID tag of the image transmitting apparatus after said printing means generates the printings and for controlling said output means on the basis of the ID information retained by said retaining means so as to output the printings printed based on the image data transmitted from said image transmitting apparatus identified by the approved ID information.

10. An apparatus according to claim 9, wherein the printing apparatus prints images related to image data transmitted from a plurality of said image transmitting apparatuses, and said output means retains printings related to image data transmitted from the plurality of said image transmitting apparatuses so that the printings are associated with ID information of each of the plurality of said image transmitting apparatuses.

11. An apparatus according to claim 10, wherein said output means selects a printing corresponding to the approved ID information from among printings related to image data transmitted from the plurality of said image transmitting apparatuses, and then outputs the selected printing.

12. An apparatus according to claim 10, further comprising a controlling means for storing, in a memory, ID information regarding the plurality of the image transmitting apparatuses read by the reading means before starting to print images related to image data transmitted from the plurality of the image transmitting apparatuses.

13. An apparatus according to claim 12, wherein the controlling means is capable of storing ID information regarding the another image transmitting apparatus read by the reading means in the memory as information that indicates waiting for printing, while an image based on image data transmitted from one of the plurality of the image transmitting apparatuses is being printed.

14. An apparatus according to claim 13, wherein the controlling means controls the printing means so that, after completion of printing of the image based on the image data from the one image transmitting apparatus, the printing means immediately starts printing an image based on image data transmitted from the another image transmitting apparatus.

15. An apparatus according to claim 14, wherein the controlling means controls the communication means so that, after completion of printing of an image based on image data from the one image transmitting apparatus, a command requesting the transmission of image data is sent to the another image transmitting apparatus on the basis of the information on waiting for printing that is stored in the memory, and also controls the printing means to start printing of an image based on image data transmitted from the another image transmitting apparatus in response to the transmission request command.

* * * * *